(12) United States Patent
Bensberg et al.

(10) Patent No.: US 11,928,087 B2
(45) Date of Patent: Mar. 12, 2024

(54) ACCESSING SCHEMA-FLEXIBLE DATA BY APPLYING A FIXED SCHEMA

(71) Applicant: SAP SE, Walldorf (DE)

(72) Inventors: Christian Bensberg, Heidelberg (DE); Christoph Zakwieja, Eppelheim (DE)

(73) Assignee: SAP SE, Walldorf (DE)

(*) Notice: Subject to any disclaimer, the term of this patent is extended or adjusted under 35 U.S.C. 154(b) by 22 days.

(21) Appl. No.: 17/752,050

(22) Filed: May 24, 2022

(65) Prior Publication Data

US 2023/0385249 A1 Nov. 30, 2023

(51) Int. Cl.
*G06F 16/21* (2019.01)
*G06F 16/22* (2019.01)
*G06F 16/25* (2019.01)

(52) U.S. Cl.
CPC ........ *G06F 16/213* (2019.01); *G06F 16/2282* (2019.01); *G06F 16/252* (2019.01)

(58) Field of Classification Search
None
See application file for complete search history.

(56) References Cited

U.S. PATENT DOCUMENTS

| | | | | |
|---|---|---|---|---|
| 9,886,441 B2* | 2/2018 | Bhagat | ................ | G06F 16/134 |
| 10,776,369 B2* | 9/2020 | Kaliavaradhan | ...... | G06F 16/278 |
| 11,153,383 B2* | 10/2021 | Richards | ............ | H04L 67/1097 |
| 11,403,306 B2* | 8/2022 | Kaliavaradhan | ........ | G06F 16/33 |
| 11,455,283 B2* | 9/2022 | Portisch | .............. | G06F 16/2455 |
| 11,455,296 B1* | 9/2022 | Williamson | ........ | G06F 16/2372 |
| 11,520,799 B2* | 12/2022 | Hollander | ............... | G06F 16/23 |
| 11,561,976 B1* | 1/2023 | Buchmann | ............ | G06F 16/214 |
| 11,645,247 B2* | 5/2023 | Bhatia | ................... | G06F 16/258 707/803 |
| 11,700,303 B1* | 7/2023 | Richards | ............... | G06F 16/252 709/219 |
| 11,726,846 B2* | 8/2023 | Bhatia | ................ | G06F 16/2379 719/328 |
| 2013/0138683 A1* | 5/2013 | Faitelson | ............ | G06F 16/2428 707/769 |
| 2016/0292171 A1* | 10/2016 | Bhagat | .................. | G06F 16/134 |
| 2018/0373765 A1* | 12/2018 | Kaliavaradhan | ........ | G06F 16/33 |
| 2019/0312933 A1* | 10/2019 | Richards | ........... | G06F 16/24552 |
| 2020/0301940 A1* | 9/2020 | Hollander | ............. | G06F 16/254 |
| 2022/0229835 A1* | 7/2022 | Kawabata | ........... | G06F 16/2423 |
| 2023/0044287 A1* | 2/2023 | Hrastnik | ............... | G06F 16/313 |
| 2023/0087066 A1* | 3/2023 | Lueders | ............. | G06F 16/2365 707/690 |

(Continued)

*Primary Examiner* — Kim T Nguyen
(74) *Attorney, Agent, or Firm* — Sterne, Kessler, Goldstein & Fox P.L.L.C.

(57) ABSTRACT

Disclosed herein are system, method, and computer program product embodiments for accessing a database collection. In some embodiments, an application generates a database collection. The database collection is configured to store documents (e.g., records). The application generates a database table definition. The database table definition is a proxy or adapter for the database collection. The application receives a request to be executed to be executed on the database collection from a client device. The request specifies the database table definition. The application accesses the database collection, via the database, to process the request using the database table definition.

20 Claims, 5 Drawing Sheets

(56) References Cited

U.S. PATENT DOCUMENTS

| | | | |
|---|---|---|---|
| 2023/0222105 A1* | 7/2023 | Kedlaya | G06F 16/213 |
| | | | 707/803 |
| 2023/0259521 A1* | 8/2023 | Haelen | G06F 21/604 |
| | | | 707/602 |

* cited by examiner

ACCESSING SCHEMA-FLEXIBLE DATA BY APPLYING A FIXED SCHEMA

BACKGROUND

Databases store data in data structures known as database collections. A database collection is a collection of documents. Each document is a database record. As an example, the document may be a JavaScript Object Notation (JSON) object. As such, the documents may not be constrained by rigid schemas. This may be beneficial when adding or removing fields to a given record.

However, certain applications are often unable to access database collections to retrieve, update, or insert data, given the schema-flexibility of collections. These applications are configured to communicate with database tables, or built in a way that they support database tables only, adhering to strict schemas that tables use. As a result, conventional systems do not provide an interface that allows these applications work database collections, for example to run queries.

BRIEF DESCRIPTION OF THE DRAWINGS

The accompanying drawings are incorporated herein and form a part of the specification.

In the drawings, like reference numbers generally indicate identical or similar elements. Additionally, generally, the left-most digit(s) of a reference number identifies the drawing in which the reference number first appears.

DETAILED DESCRIPTION

Figure 1:
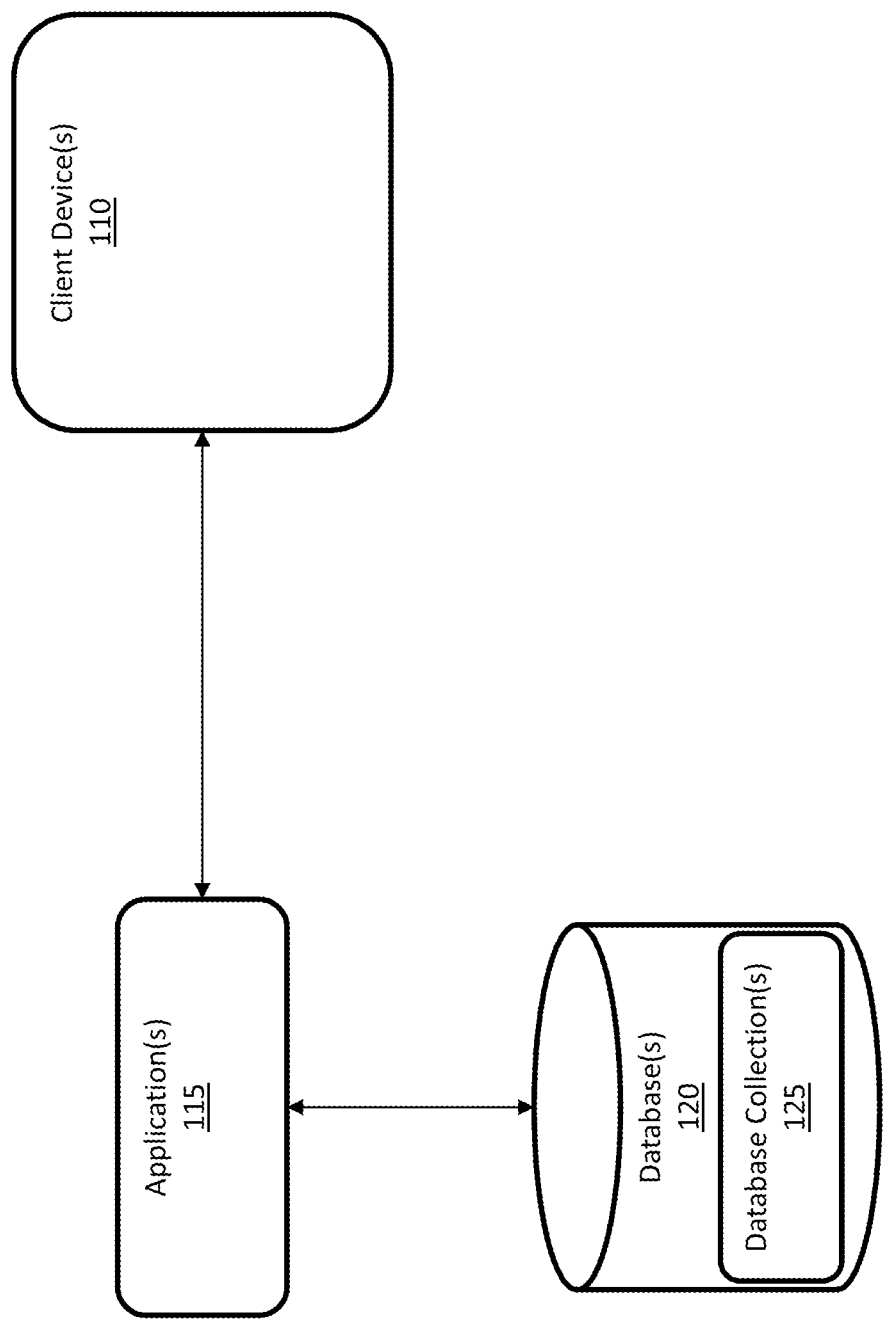
FIG. 1 is a block diagram of an architecture of a system for accessing a database collection, according to some embodiments.

Provided herein are system, apparatus, device, method and/or computer program product embodiments, and/or combinations and sub-combinations thereof, for accessing a database collection.

As described above, database collections may provide flexibility when storing data because rigid schemas do not constrain database collections. For example, multiple applications may need to access records in a database collection. The applications may need to retrieve, update, or insert values for different fields. The database collection may provide the necessary schema flexibility to perform such actions, as different applications have different requirements or need slightly different pieces of the same data. However, some conventional systems do not provide an interface for applications to access database collections. Rather, applications may be configured to access database tables. This prevents the applications from retrieving, updating, or inserting values in the database collection.

Embodiments described herein solve these problems by using database table definitions tied to a database collection to allow applications to access the database collection using the database table definitions. In some embodiments, an application generates a database collection. The database collection is configured to store documents (e.g., records). The application generates a database table definition. The database table definition is a proxy for the database collection. The application receives a request to be executed on the database collection from a client device. The request specifies the database table definition. The application accesses the database collection, in the database, to process the request using the database table definition.

The request specifies the database table definition as a proxy or adapter for the underlying collection. This can be compared with applications accessing views rather than tables directly. Based on configuration, the database table definitions of various applications may point to the same underlying collection. This way, applications may use the same data source (e.g., the collection) using their respective database table definitions. In some embodiments, the fact that a collection is the underlying data source may be shielded from all or most aspects of the applications.

The embodiments described herein provide schema-defined database tables overtop a database collection. This allows applications to access the database collection using the schema-defined database tables. As a result, multiple applications may access a single data source (e.g., the database collection). Moreover, multiple different versions of the same application may access a single data source. This allows for maintaining a single consolidated data source. Over time, new versions of the same application require more or different fields. Usually, when upgrading an application from one version to another, it may be necessary to migrate the data in the database table as the schema changes. Especially with micro-services, updates of applications may happen more often, and also several versions of the same version may run independently, yet access the same data.

FIG. 1 is a block diagram of an architecture of a system for accessing a database collection, according to some embodiments. In an embodiment, the architecture may include applications(s) 115, client device(s) 110, and database(s) 120. The devices in the architecture can be connected through wired connections, wireless connections, or a combination of wired and wireless connections.

As an example, the devices can be connected through a network. The network can be an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

Database 120 may be one or more databases configured to store structured (like tables), semi-structures (like JSON documents in a collection) and unstructured data (like text or images). Database 120 may store database collection(s) 125. Database collection 125 may store one or more documents. Each document is a database record. The documents may include fields, values for the fields, and deeply nested data and arrays (lists). Database collections 125 may be configured to be queried using database languages such as SQL. As such, values from the documents of database collections 125 may be retrieved using queries. The documents may be in a JSON format.

Client device 110 may execute application 115. Application 115 may run as a stand-alone program or in an application server. The runtime of application 115 may be on the client device or be in a data center in a server. In the latter case, the application 115 presents its data to the client device 110, for example in a web browser that runs on client device 115. Application 115 is configured to communicate with database 120. Application 115 may retrieve, update, and insert values in database collection 125, via "adapter tables" on top of database collection 125 or directly.

Application 115 may communicate with database 120 to create database table definitions tied to database collection 125. The database table definitions may include fields associated with a database table. The fields may include a primary key and a foreign key.

Figure 2:
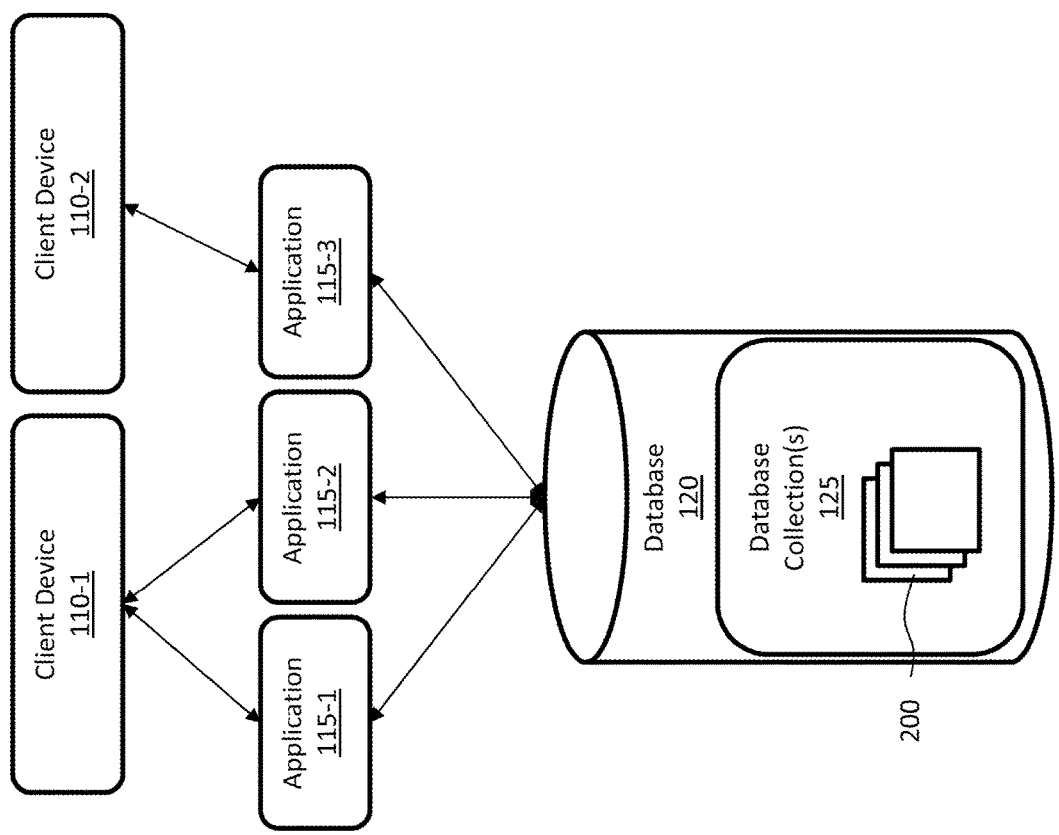
FIG. 2 is a block diagram of an example configuration the system for accessing a database collection, according to some embodiments.

FIG. 2 is a block diagram of an example configuration the system for accessing a database collection, according to some embodiments. FIG. 2 will be described with respect to FIG. 1.

In some embodiments, the example configuration may include client device 110-1, client device 110-2, application 115-1, 115-2 and 115-3 and database 120. Client device 110-1 may use applications 115-1 and 115-2. Client device 110-2 may execute application 115-3. Database 120 may store database collection 125, and database collection 125 may include documents 200.

Applications 115-1 and 115-2 may be different versions of the same application. Application 115-3 may be a different application as compared to applications 115-1 and 115-2. Applications 115-1-115-3 may work on the same data.

Each of documents 200 is a record. Applications 115-1-115-3 may use documents 200. Additionally, applications 115-1-115-3 may execute operations on documents 200. As such, applications 115-1-115-3 may need to access database collection 125 to update, insert, or retrieve values from documents 200. In this regard, applications 115-1-115-3 may transmit database commands, such as INSERT, SELECT. UPDATE, etc., to be executed on documents 200.

As a non-limiting example, database collection 125 may store documents associated with a company's employees. Applications 115-1 and 115-2 may be associated with employee payroll. Application 115-3 may be associated with employee healthcare. Applications 115-1 and 115-2 may be managed and operated by a first department (e.g., first user), and application 115-3 may be operated by a second department (e.g., second user). As such, database collection 125 may support multiple purposes.

Database 120 may receive a request to create database collection 125. The request may be from application 115-1, 115-2 or 115-3 or a different application. Database collection 125 may be crated using the following command: "CREATE COLLECTION employeeData". "employeeData" may be the name of database collection 125.

Application 115-1 may transmit a request to database 120 to create a first database table definition. The request may include a schema for the first database table definition. The schema may include fields. The request may include instructions for associating the first database table definition with database collection 125. The first database table definition may be specific for application 115-1.

Application 115-1 may generate the first database table definition using the following command: "CREATE TABLE employeePayroll (employeeID int, name nvarchar(30), salary int, PRIMARY KEY(employeeID)) USING COLLECTION employeeData". The first database table definition's name/identifier may be employeePayroll. The fields may be employeeID, an integer value, name, a character value, and salary, an integer value. The primary key of the first database table definition may be employeeID. The "USING COLLECTION employeeData" suffix may associate the first database table definition with database collection 125. Application 115-1 may store the first database table definition in database 120.

Application 115-1 may transmit a request to database 120 to create a second database table definition. The request may include a schema for the second database table definition. The schema may include fields. The request may include instructions for associating the second database table definition with database collection 125. The second database table definition may be specific for application 115-1.

Application 115-1 may generate the second database table definition as follows: "CREATE TABLE employmentDetails (employeeID int, startDate int, positionID nvarchar(30), PRIMARY KEY(employeeID, positionID), FOREIGN KEY(employeeID) REFERENCES customers(employeeID)) USING COLLECTION employeeData". The second database table definition's name/identifier may be employmentDetails. The fields may be employeeID, an integer value, startDate, an integer value, and positionID, a character value. The primary keys of the second database table definition may be employeeID and positionID. The foreign key relationship to the first database definition may be employeeID. The "USING COLLECTION employeeData" command may associate the second database table definition with database collection 125. Application 115-1 may store the second database table definition in database 120.

Application 115-2 may transmit a request to database 120 to create a third database table definition. The request may include a schema for the third database table definition. The schema may include fields. The request may include instructions for associating the third database table definition with database collection 125. The third database table definition may be for application 115-2. Since applications 115-1 and 115-2 are different versions of the same application, they may share similar fields in the database table definitions.

Application 115-2 may generate the third database table definition as follows: CREATE TABLE employeePayroll_v2 (employeeID int, name nvarchar(30), salary int, bonus int, PRIMARY KEY(employeeID)) USING COLLECTION employeeData. The third database table definition's name/identifier may be employeePayroll_v2. The fields may be employeeID, an integer value, name, a character value, salary, an integer value, and bonus, an integer value. The primary key of the third database table definition may be employeeID. The "USING COLLECTION employeeData" command may associate the third database table definition with database collection 125. Application 115-2 may store the third database table definition in database 120.

Application 115-2 may transmit a request to database 120 to create a fourth database table definition. The request may include a schema for the fourth database table definition. The schema may include fields. The request may include instructions for associating the fourth database table definition with database collection 125. The fourth database table definition may be for application 115-2.

Application 115-2 may generate the fourth database table definition as follows: CREATE TABLE employmentDetails_v2 (employeeID int, startDate int, positionID nvarchar(30), officeLocation nvarchar(30), PRIMARY KEY(employeeID, positionID), FOREIGN KEY(employeeID) REFERENCES customers(employeeID)) USING COLLECTION employeeData. The fourth database table definition's name/identifier may be employmentDetails_v2. The fields may be employeeID, an integer value, startDate, an integer value, positionID, a character value, and officeLocation, a nvarchar value. The primary keys of the fourth database table definition may be employeeID and positionID. The foreign key relationship to the third database definition may be employeeID. The "USING COLLECTION employeeData" command may associate the fourth database table definition with database collection 125. Application 115-2 may store the fourth database table definition in database 120.

Application 115-3 may transmit a request to database 120 to create a fifth database table definition. The request may include a schema for the fifth database table definition. The schema may include fields. The request may include instructions for associating the fifth database table definition with database collection 125. The fifth database table definition may be for application 115-3.

Application 115-3 may generate the fifth database table definition as follows CREATE TABLE employmentHealthcare (employeeID int, startDate int, healthcarePlan nvarchar (30), PRIMARY KEY(employeeID, healthcarePlan), FOREIGN KEY(employeeID) REFERENCES customers (employeeID)) USING COLLECTION employeeData. The fifth database table definition's name/identifier may be employmentHealthcare. The fields may be employeeID, an integer value, startDate, an integer value, and healthcare plan, a character value. The primary key of the fifth database table definition may be employeeID and healthcare plan. The foreign key relationship to the first and third database definitions may be employeeID. The "USING COLLECTION employeeData" command may associate the fifth database table definition with database collection 125. Application 115-3 may store the fifth database table definition in database 120.

The first through fifth database table definitions may be pointers to database collection 125. Database 120 may allow applications 115-1-115-3 to update, retrieve, and insert values in database collection 125 using the first through fifth database definitions. To this end, applications 115-1-115-3 may transmit commands to database 120 to update, retrieve, and insert values in database collection 125 using the first through fifth database table definitions.

For example, application 115-1 may transmit a request to database 120 to insert the following values into database collection 125: INSERT into employeePayroll (1, John Smith, $50,000).

Database 120 identifies the first database table definition based on the name/identifier in the request, "employeePayroll". Database 120 may determine that in the request, "1" is the employeeID, "John Smith" is the name, and "$50,000" is the salary. Database 120 may determine that the first database definition is associated with database collection 125.

Database 120 may attempt to identify a document in documents 200, including the employeeID value of "1" since employeeID is the primary key in the first database table definition. If database 120 cannot locate a document in documents 200, a document with an employeeID value of "1", database 120 may create a new document in documents 200. Database 120 may insert the employeeID, name, and salary fields and values included in the request in the new document. In this regard, the new document may be structured as follows:

```
{
    "employeeID": 1,
    "name": "John Smith",
    "salary": 50000
}
```

Application 115-1 may transmit a request to database 120 to insert the following values into database collection 125: INSERT into employmentDetails (1, 02012022, manager).

Database 120 identifies the second database table definition based on the name/identifier in the request, "employmentDetails". Database 120 may retrieve the second database table definition from database 120. Database 120 may determine that in the request, "1" is the employeeID, "02012022" is the startDate, and "manager" is the positionID. Database 120 may determine that the second database definition is associated with database collection 125. Furthermore, database 120 may determine that the second database table definition (e.g., employmentDetails) has a foreign key relationship with the first database table definition (e.g., employeePayroll). As indicated above, the employeeID may be the foreign key.

Database 120 may identify a record in documents 200, including the employeeID value of "1" since employeeID is part of the primary key in the second database table definition and the foreign key. Database 120 may determine that the fields and values for startDate and positionID are to be added in the document for the identified record. Database 120 may add the values and fields for startDate and positionID to the document. In this regard, the document may be structured as follows:

```
{
    "employeeID": 1,
    "name": "John Smith",
    "salary": 50000,
    "employmentDetails":
        {"startDate": 020120222, "positionID": "manager"}
}
```

As illustrated above, the document maintains the foreign-key relationships between the first and second database table definitions to form deeply nested structures (e.g., JSON structures). In this example, the table definitions require a 1:1 relationship. If a 1:n relationship was specified, "employmentDetails" would have been an array with zero to n elements. The INSERT described above would have added one element to the array.

Application 115-2 may transmit a request to database 120 to insert the following values into database collection 125: INSERT into employeePayroll_v2 (2, Marcus Anderson, $60,000, $5,000).

Database 120 identifies the third database table definition based on the name/identifier in the request, "employeePayroll_v2". Database 120 may retrieve the third database table definition from database 120. Database 120 may determine that in the request. "2" is the employeeID, "Marcus Anderson" is the name, "$60,000" is the salary, and "$5000" is the bonus. Database 120 may determine that the third database definition is associated with database collection 125.

Database 120 may attempt to identify a record in documents 200, including the employeeID value of "2" since employeeID is the primary key in the first database table definition. If database 120 cannot locate a record in documents 200, a record with an employeeID value of "2", database 120 may create a new document in documents 200. Database 120 may insert the employeeID, name, salary, and bonus fields and values included in the request in the new document. In this regard, the new document may be structured as follows:

```
{
```

-continued

```
    "employeeID": 2,
    "name": "Marcus Anderson",
    "salary": 60000,
    "bonus": 5000
}
```

Application 115-2 may transmit a request to database 120 to insert the following values into database collection 125: INSERT into employmentDetails_v2 (2, 03032021, CEO, Denver).

Database 120 identifies the fourth database table definition based on the name/identifier in the request, "employmentDetails_v2". Database 120 may retrieve the fourth database table definition from database 120. Database 120 may determine that in the request, "2" is the employeeID, "03032021" is the startDate, "CEO" is the positionID, and "Denver" is the officeLocation. Database 120 may determine that the fourth database definition is associated with database collection 125. Furthermore, database 120 may determine that the fourth database table definition (e.g., employmentDetails_v2) has a foreign key relationship with the first and third database table definitions (e.g., employeePayroll and employeePayroll_v2). As indicated above, the employeeID may be the foreign key.

Database 120 may identify a record in documents 200, including the employeeID value of "2" since employeeID is part of the primary key in the second database table definition and the foreign key. Database 120 may determine that the fields and values for startDate, positionID and officeLocation are to be added in the document for the identified record. Database 120 may add the values and fields for startDate, positionID, and officeLocation in the document. In this regard, the document may be structured as follows:

```
{
    "employeeID": 2,
    "name": "Marcus Anderson,
    "salary": 60000,
    "bonus": 5000,
    "employmentDetails:
        {"startDate": 030320221, "positionID": "CEO",
         "officeLocation": "Denver"}
}
```

As illustrated above, document collection 125 may store records associated with applications 115-1 and 115-2 even though applications 115-1 and 115-2 use different database table definitions. In this regard, applications 115-1 and 115-2 may use schema definitions, while database collection 125 provides schema-flexibility. Furthermore, document collection 125 may support different versions of the same application.

Database 120 may receive a request to retrieve all the values in employeePayroll and employmentDetails from application 115-1. The request may include the following command: SELECT * FROM employeePayroll AS P LEFT OUTER JOIN employmentDetails AS D ON p.customerId=d.customerId;

Database 120 may determine that the first and second database table definitions are used to retrieve the values based on the names or identifiers of the first and second table definitions in the request. Database 120 may retrieve the values from database collection 125. Database collection 125 may return the following values:

TABLE 1

| employeeID | Name | salary | startDate | positionID |
|---|---|---|---|---|
| 1 | John Smith | $50,000 | Feb. 1, 2022 | manager |
| 2 | Marcus Anderson | $60,000 | Mar. 3, 2021 | CEO |

As indicated in Table 1, even though the values for Marcus Anderson were input based on a request from application 115-2, database 120 retrieves values for both records in accordance with the first and second database definitions.

Database 120 may receive a request to retrieve all the values in employeePayroll_2 and employmentDetails_v2 from application 115-2. The request may include the following command:

```
SELECT * FROM employeePayroll_v2 AS P
    LEFT OUTER JOIN employmentDetails_v2 AS D
    ON p.customerId = d.customerId;
```

Database 120 may determine that the first and second database table definitions are used to retrieve the values based on the names or identifiers of the third and fourth table definitions in the request. Database 120 may retrieve the values from database collection 125. Database collection 125 may return the following values:

TABLE 2

| employeeID | Name | salary | bonus | startDate | positionID | officeLocation |
|---|---|---|---|---|---|---|
| 1 | John Smith | $50,000 | null | Feb. 1, 2022 | manager | null |
| 2 | Marcus Anderson | $60,000 | $5,000 | Mar. 3, 2021 | CEO | Denver |

As indicated in Table 2, database 120 can retrieve values for both records in accordance with the third and fourth database definitions. Since the values for "John Smith" were input in accordance with the first and second table definitions, the values for bonus and officeLocation may be null.

In another example, the table definition for table 1 is changed in a way that associates the use of table "employeePayroll" with department 5. In this case, when application 115-1 transmits a request to database 120 to insert the following values into database collection 125: INSERT into employeePayroll (3, Jane Kim, $70,000).

Database 120 identifies the first database table definition based on the name/identifier in the request, "employeePayroll". Database 120 may retrieve the first database table definition from database 120. Database 120 may determine that in the request. "3" is the employeeID, "Jane Kim" is the name, "$70,000" is the salary. The department identifier may be derived by the database 120 automatically as table "employeePayroll" is being used for the INSERT. In this example, for table "employeePayroll" the department identifier 5 is specified. Database 120 may determine that the first database definition is associated with database collection 125.

Database 120 may attempt to identify a record in documents 200, including the employeeID value of "3" since employeeID is the primary key in the first database table definition. If database 120 cannot locate a record in documents 200, a record with an employeeID value of "3", database 120 may create a new document in documents 200. Database 120 may insert the employeeID, name, and salary values included in the request in the new document.

In this regard, the new document may be structured as follows:

```
{
    "employeeID": 3,
    "name": "Jane Kim",
    "salary": 70000,
    "departmentIdentifier": 5
}
```

Application 115-3 may transmit a request to database 120 to insert the following values into database collection 125: INSERT into employeeHealthcare (3, 05012015, insurance).

Database 120 identifies the fifth database table definition based on the name/identifier in the request. "employeeHealthcare". Database 120 may retrieve the fifth database table definition from database 120. Database 120 may determine that in the request, "3" is the employeeID, "05012015" is the startDate, "insurance" is the healthcare plan. Database 200 derives from the used table definition that the department identifier is 2. Database 120 may determine that the first database definition is associated with database collection 125.

Database 120 may identify a record in documents 200, including the employeeID value of "3" since employeeID is part of the primary key in the fifth database table definition. Database 120 may insert the startDate, healthcare values, and department identifier included in the request in the document associated with the record.

In this regard, the document may be structured as follows:

```
{
    "employeeID": 3,
    "name": "Jane Kim",
    "salary": 70000,
    "employeeHealthcare": {
        "startDate": "05012015",
        "healthcarePlan": "insurance",
        "departmentIdentifier": 2 }
}
```

In some embodiments, applications 115-1-115-3 may transmit a request to database 120 to update or insert multiple values for multiple different records in database collection 125. As illustrated above, employee 1 now has additional fields or extensions coming from different applications.

Figure 3:
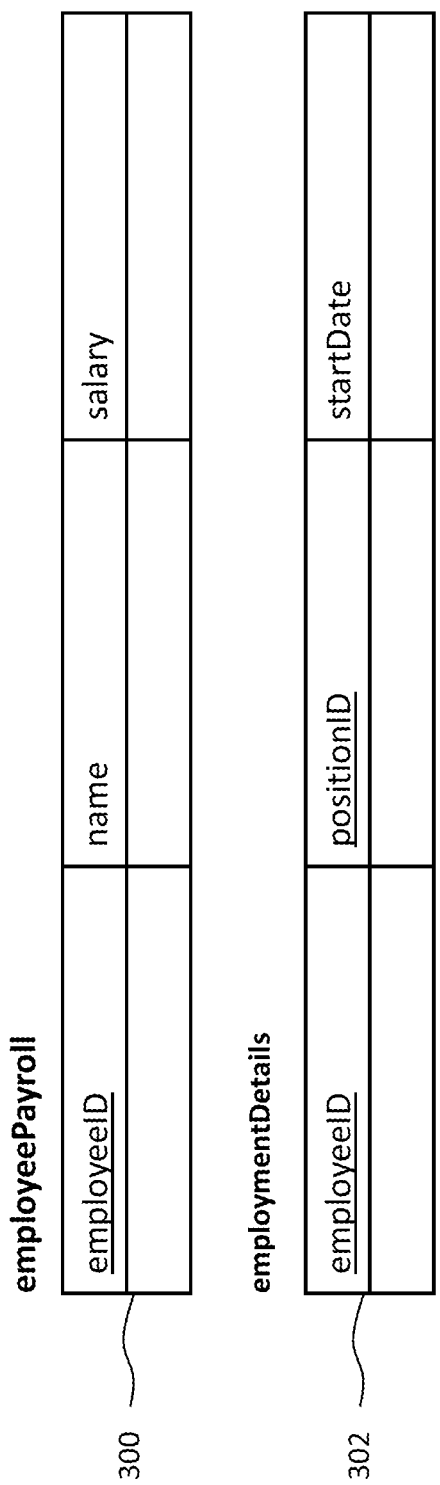
FIG. 3 illustrates the mapping of the database table definitions, according to some embodiments.

FIG. 3 illustrates the mapping of the database table definitions, according to some embodiments. FIG. 3 will be described with reference to FIG. 2

In some embodiments, a first database table definition 300 may include the fields employeeID, name, and salary. EmployeeID may be the primary key.

A second database table definition 302 may include the fields employeeID, positionID, and startDate. The employeeID may be the foreign key that is common to both first database table definition 300 and second database table definition 302. The positionID may be a local key in the second database table definition 302.

EmployeeID, name, and salary may remain un-nested in a document associated with the given record in database collection 125. Furthermore, positionID and startDate may be nested in the document.

Figure 4:
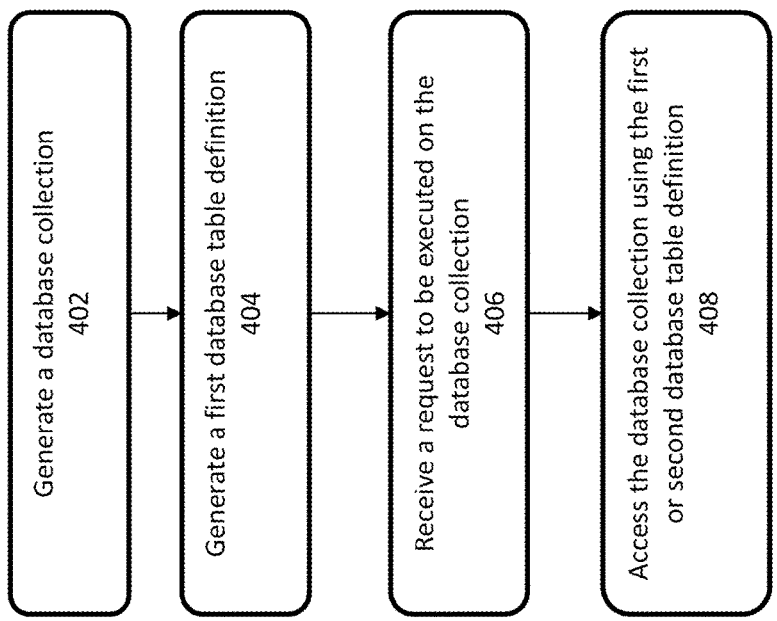
FIG. 4 is a flowchart illustrating a process for accessing a database collection, according to some embodiments.

FIG. 4 is a flowchart illustrating a process for accessing a database collection, according to some embodiments. Method 400 can be performed by processing logic that can comprise hardware (e.g., circuitry, dedicated logic, programmable logic, microcode, etc.), software (e.g., instructions executing on a processing device), or a combination thereof. It is to be appreciated that not all steps can be needed to perform the disclosure provided herein. Further, some of the steps can be performed simultaneously, or in a different order than shown in FIG. 4, as will be understood by a person of ordinary skill in the art.

Method 400 shall be described with reference to FIG. 1. However, method 400 is not limited to that example embodiment.

In 402, application 115 generates database collection 125 in database 120. Database collection 125 may store one or more documents. Database collection 125 may be schema-free.

In 404, application 115 generates a database table definition. The database table definition comprises a set of fields. The database definition uses database collection 125. Application 115 may store the first database table definition in database 120.

In 406, application 115 receives a request from client device 110 to be executed on database collection 125. The request may include the database table definition. The request may be to retrieve, update, or insert values in database collection using the first or second database table definition. The request may include the first set of fields of the first database table definition or the second set of fields of the second database table definition.

In 408, application 115 accesses database collection 125, via database 120, to process the request using the database table definition. If the request is to retrieve values from database collection 125, database 120 may identify the document in database collection 125 using a value of a primary key of the set of fields included in the request. Database 120 may retrieve the requested values from the document. If the request is to insert values in database collection 125, database 120 may insert the values in a record in database collection 125 in accordance with the database table definition. Database 120 may maintain the primary key and foreign key relationships in the record.

Figure 5:
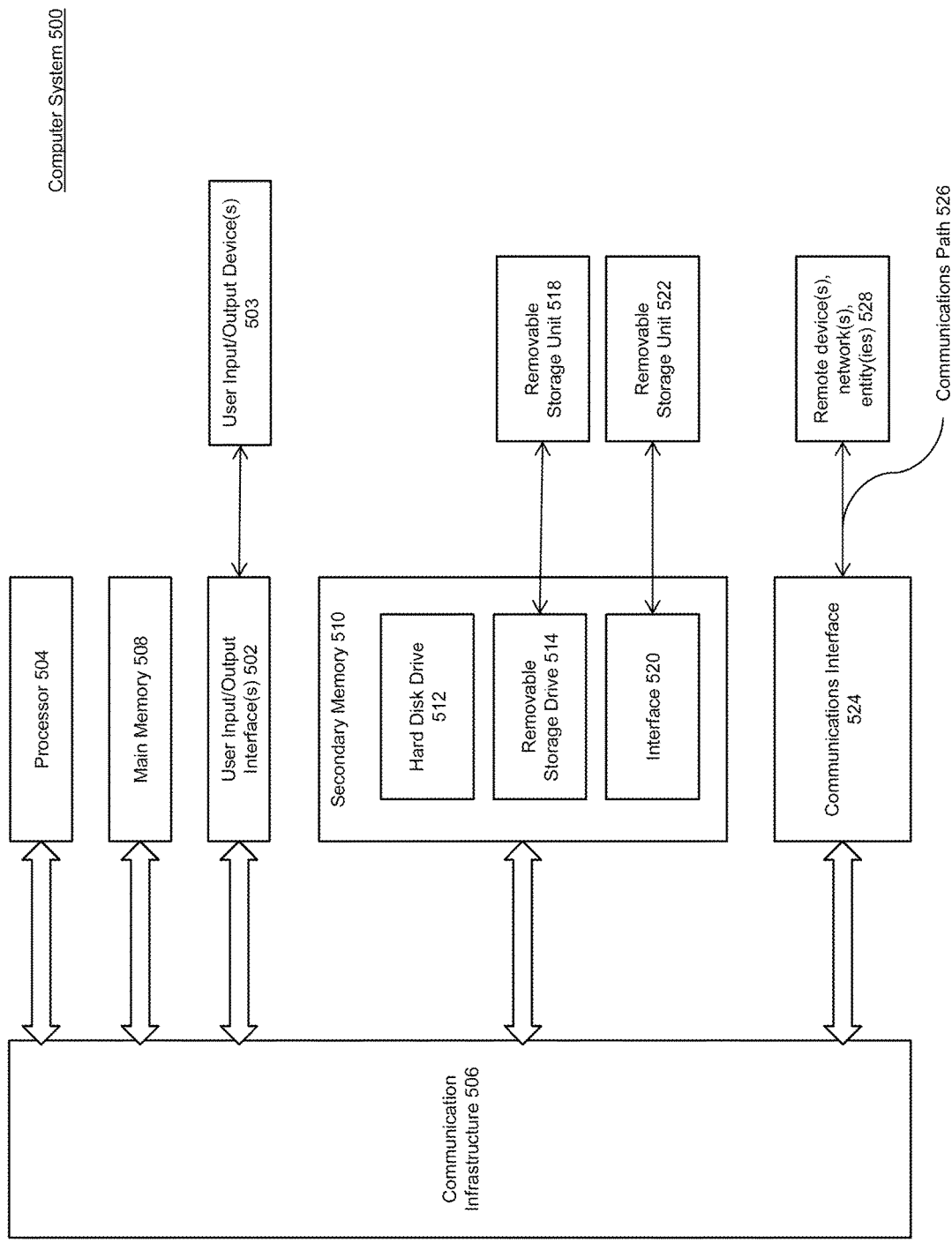
FIG. 5 is an example computer system useful for implementing various embodiments.

Various embodiments can be implemented, for example, using one or more computer systems, such as computer system 500 shown in FIG. 5. Computer system 500 can be used, for example, to implement methods 400 of FIG. 4. Furthermore, computer system 500 can be at least part of database 120, client device 110, and database 120, as shown in FIG. 1. For example, computer system 500 route communication to various applications. Computer system 500 can be any computer capable of performing the functions described herein.

Computer system 500 can be any well-known computer capable of performing the functions described herein.

Computer system 500 includes one or more processors (also called central processing units, or CPUs), such as a processor 504. Processor 504 is connected to a communication infrastructure or bus 506.

One or more processors 504 can each be a graphics processing unit (GPU). In an embodiment, a GPU is a processor that is a specialized electronic circuit designed to process mathematically intensive applications. The GPU can have a parallel structure that is efficient for parallel processing of large blocks of data, such as mathematically intensive data common to computer graphics applications, images, videos, etc.

Computer system 500 also includes user input/output device(s) 503, such as monitors, keyboards, pointing devices, etc., that communicate with communication infrastructure 506 through user input/output interface(s) 502.

Computer system 500 also includes a main or primary memory 508, such as random access memory (RAM). Main memory 508 can include one or more levels of cache. Main memory 508 has stored therein control logic (i.e., computer software) and/or data.

Computer system 500 can also include one or more secondary storage devices or memory 510. Secondary memory 510 can include, for example, a hard disk drive 512 and/or a removable storage device or drive 514. Removable storage drive 514 can be a floppy disk drive, a magnetic tape drive, a compact disk drive, an optical storage device, tape backup device, and/or any other storage device/drive.

Removable storage drive 514 can interact with a removable storage unit 518. Removable storage unit 518 includes a computer usable or readable storage device having stored thereon computer software (control logic) and/or data. Removable storage unit 518 can be a floppy disk, magnetic tape, compact disk. DVD, optical storage disk, and/any other computer database. Removable storage drive 514 reads from and/or writes to removable storage unit 518 in a well-known manner.

According to an exemplary embodiment, secondary memory 510 can include other means, instrumentalities, or other approaches for allowing computer programs and/or other instructions and/or data to be accessed by computer system 500. Such means, instrumentalities, or other approaches can include, for example, a removable storage unit 522 and an interface 520. Examples of the removable storage unit 522 and the interface 520 can include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 500 can further include a communication or network interface 524. Communication interface 524 enables computer system 500 to communicate and interact with any combination of remote devices, remote networks, remote entities, etc. (individually and collectively referenced by reference number 528). For example, communication interface 524 can allow computer system 500 to communicate with remote devices 528 over communications path 526, which can be wired and/or wireless, and which can include any combination of LANs, WANs, the Internet, etc. Control logic and/or data can be transmitted to and from computer system 500 via communication path 526.

In an embodiment, a tangible, non-transitory apparatus or article of manufacture comprising a tangible, non-transitory computer useable or readable medium having control logic (software) stored thereon is also referred to herein as a computer program product or program storage device. This includes, but is not limited to, computer system 500, main memory 508, secondary memory 510, and removable storage units 518 and 522, as well as tangible articles of manufacture embodying any combination of the foregoing. Such control logic, when executed by one or more data processing devices (such as computer system 500), causes such data processing devices to operate as described herein.

Based on the teachings contained in this disclosure, it will be apparent to persons skilled in the relevant art(s) how to make and use embodiments of this disclosure using data processing devices, computer systems and/or computer architectures other than that shown in FIG. 5. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment." "an example embodiment," or similar phrases indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other but yet still co-operate or interact with each other.

The breadth and scope of this disclosure should not be limited by any of the above-described exemplary embodiments, but should be defined only in accordance with the following claims and their equivalents.

What is claimed is:

1. A computer-implemented method, the computer-implemented method comprising:
   receiving, from a first application, a request to access a collection, the collection comprising a plurality of documents, wherein the request includes a first schema for generating a first table definition for accessing the collection;
   generating the first table definition for providing the first application access to the plurality of documents of the collection, the first table definition comprising a plurality of fields for accessing data in the plurality of documents of the collection;
   receiving, from the first application, a request based on one or more of the plurality of fields of the first table definition to be executed on one or more documents of the plurality of documents of the collection, wherein the request comprises one of a insert or read command; and
   accessing the one or more documents of the collection to process the request using the first table definition.

2. The computer-implemented method of claim 1, wherein receiving the request based on one or more of the plurality of fields comprises inserting one or more values in a new document in the collection, wherein each of the one or more values corresponds with a respective field of a set of fields.

3. The computer-implemented method of claim 2, wherein inserting the one or more values in the new document comprises populating a unique identification (ID) value of a user associated with the request in the new document.

4. The computer-implemented method of claim 1, wherein the request based on one or more of the plurality of fields comprises a set of values to be inserted into a first document in the collection, and wherein the document comprises a set of fields from the plurality of fields.

5. The computer-implemented method of claim 4, wherein the accessing comprises:
   identifying the first document comprising a first value of the set of values, wherein the first value corresponds to a respective field of the set of fields;
   inserting a second set of fields in the first document; and
   populating the second set of fields with one or more of the set of values.

6. The computer-implemented method of claim 1, wherein accessing comprises retrieving one or more values associated with a first document from the collection, wherein each of the one or more values corresponds with the first table definition.

7. The computer-implemented method of claim 1, wherein the request based on one or more of the plurality of fields comprises an identifier of the first table definition.

8. The computer-implemented method of claim 1, wherein the first application is configured to access the collection using the first table definition, and wherein a second application is configured to access the collection using a second table definition different from the first table definition.

9. A system for accessing a database collection, the system comprising:
   a memory; and
   a processor coupled to the memory, wherein the processor is configured to:
   receive, from a first application, a request to access a collection, the collection comprising a plurality of documents, wherein the request includes a first schema for a first table definition for accessing the collection;
   generate the first table definition for providing the first application access to the plurality of documents of the collection, the first table definition comprising a plurality of fields for accessing data in the plurality of documents of the collection;
   receive, from the first application, a request based on one or more of the plurality of fields of the first table definition to be executed on one or more documents of the plurality of documents of the collection, wherein the request comprises one of a insert or read command; and
   access the one or more documents of the collection to process the request using the first table definition.

10. The system of claim 9, wherein receiving the request based on one or more of the plurality of fields comprises inserting one or more values in a new document in the collection, wherein each of the one or more values corresponds with a respective field of a set of fields.

11. The system of claim 10, wherein inserting the one or more values in the new document comprises populating a unique identification (TD) value of a user associated with the request in the new document.

12. The system of claim 9, wherein the request based on one or more of the plurality of fields comprises a set of values to be inserted into a first document in the collection, and wherein the document comprises a set of fields from the plurality of fields.

13. The system of claim 12, wherein when the accessing the processor is configured to:
   identify the first document comprising a first value of the set of values, wherein the first value corresponds to a respective field of the set of fields;
   insert a second set of fields in the first document; and
   populate the second set of fields with one or more of the set of values.

14. The system of claim 9, wherein when wherein accessing comprises retrieving one or more values associated with a first document from the collection, wherein each of the one or more values corresponds with the first table definition.

15. The system of claim 9, wherein the request based on one or more of the plurality of fields comprises an identifier of the first table definition.

16. A non-transitory computer-readable medium having instructions stored thereon that, when executed by at least one computing device, cause the at least one computing device to perform operations comprising:
   receiving, from a first application, a request to access a collection, the collection comprising a plurality of documents, wherein the request includes a first schema for a first table definition for accessing the collection;
   generating the first table definition for providing the first application access to the plurality of documents of the collection, the first table definition comprising a plurality of fields for accessing data in the plurality of documents of the collection;
   receiving, from the first application, a request based on one or more of the plurality of fields of the first table definition to be executed on one or more documents of the plurality of documents of the collection, wherein the request comprises one of a insert or read command; and accessing the one or more documents of the collection to process the request using the first table definition.

17. The non-transitory computer-readable medium of claim 16, wherein receiving the request based on one or more of the plurality of fields comprises inserting one or more values in a new document in the collection, wherein each of the one or more values corresponds with a respective field of a set of fields.

18. The non-transitory computer-readable medium of claim 16, wherein the request based on one or more of the plurality of fields comprises a set of values to be inserted into a first document in the collection, and wherein the document comprises a set of fields from the plurality of fields.

19. The non-transitory computer-readable medium of claim 18, wherein the accessing comprises:

identifying the first document comprising a first value of the set of values, wherein the first value corresponds to a respective field of the set of fields;

inserting a second set of fields in the first document; and populating the second set of fields with one or more of the set of values, wherein a field in the second set of fields has a foreign key relationship with the set of fields.

20. The non-transitory computer-readable medium of claim 16, wherein accessing comprises retrieving one or more values associated with a first document from the collection, wherein each of the one or more values corresponds with the first table definition.

\* \* \* \* \*